United States Patent
Shigeno et al.

(10) Patent No.: US 11,391,755 B2
(45) Date of Patent: Jul. 19, 2022

(54) SCANNING PROBE MICROSCOPE AND SETTING METHOD THEREOF

(71) Applicant: HITACHI HIGH-TECH SCIENCE CORPORATION, Tokyo (JP)

(72) Inventors: Masatsugu Shigeno, Tokyo (JP); Hiroyoshi Yamamoto, Tokyo (JP); Yoshiteru Shikakura, Tokyo (JP); Kunihito Higa, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 17/203,117

(22) Filed: Mar. 16, 2021

(65) Prior Publication Data
US 2021/0293849 A1 Sep. 23, 2021

(30) Foreign Application Priority Data
Mar. 18, 2020 (JP) .............................. JP2020-047892

(51) Int. Cl.
G01Q 10/06 (2010.01)
G01Q 30/04 (2010.01)
(52) U.S. Cl.
CPC ........... G01Q 10/065 (2013.01); G01Q 30/04 (2013.01)
(58) Field of Classification Search
CPC .............................. G01Q 10/065; G01Q 30/04
USPC ........................... 850/1, 2, 3, 4, 5, 6, 7, 8, 9
See application file for complete search history.

(56) References Cited

U.S. PATENT DOCUMENTS

2018/0284151 A1* 10/2018 Shigeno ............... G01Q 10/045

FOREIGN PATENT DOCUMENTS

| JP | 200133373 A | 2/2001 |
| JP | 2011209073 A | 10/2011 |

* cited by examiner

Primary Examiner — Nicole M Ippolito
(74) Attorney, Agent, or Firm — Holland & Hart LLP

(57) ABSTRACT

Provided are a scanning probe microscope and a setting method thereof that contribute to a reduction in the time taken for measuring. The scanning probe microscope includes: a movement driving unit capable of moving a cantilever and a sample relatively in at least a z direction; and a control device operating an approach operation of making the cantilever and the sample approach to each other at a predetermined speed by controlling the movement driving unit, and stopping the approach operation when it is determined that the probe and the sample are in contact with each other, wherein the predetermined speed is set such that when the control for stopping the approach operation is performed, force applied to the sample due to contact between the probe and the sample does not exceed a preset first force.

7 Claims, 4 Drawing Sheets

SCANNING PROBE MICROSCOPE AND SETTING METHOD THEREOF

CROSS REFERENCE TO RELATED APPLICATION(S)

This application claims the benefit of Japanese Patent Application No. 2020-047892, filed Mar. 18, 2020, which is hereby incorporated by reference in its entirety into this application.

BACKGROUND OF THE INVENTION

1. Technical Field

The present disclosure relates to a scanning probe microscope and a setting method thereof.

2. Description of the Related Art

A scanning probe microscope is known as an instrument that measures a shape of a sample surface by making a probe provided at a front end of a cantilever come into contact with a sample and making the probe perform scanning continuously or intermittently (for example, see Patent Document 1 and Patent Document 2).

The time taken to measure the shape of the sample surface depends on an approach speed that is the speed at which the probe is made to approach the sample surface, or on a separation distance that is the distance at which the probe in contact with the sample surface is separated therefrom. At least one of the following contributes to a reduction in the time taken for measuring: making the approach speed as fast as it can be, and making the separation distance as short as it can be.

DOCUMENTS OF RELATED ART (Patent Document 1) Japanese Patent Application Publication No. 2001-033373
(Patent Document 2) Japanese Patent Application Publication No. 2011-209073

SUMMARY OF THE INVENTION

Depending on the setting of the approach speed, there is a probability that the probe is unable to stop at a predetermined position and pushes the sample surface too much. In addition, depending on the setting of the separation distance, there is a probability that the probe and the sample are not separated from each other. Therefore, the setting of the approach speed or the separation distance is set by a user, including a wide margin. Because of this, it has been impossible to reduce the time taken for measuring up to now.

The present disclosure has been made keeping in mind the above problem, and the present disclosure is directed to providing a scanning probe microscope and a setting method thereof that contribute to a reduction in the time taken for measuring.

(1) According to an aspect of the present disclosure, there is provided a scanning probe microscope for scanning a surface of a sample with a probe of a cantilever, the scanning probe microscope including: a movement driving unit capable of moving the cantilever and the sample relatively at least in z direction; and a control device controlling the movement driving unit to perform an approach operation of making the cantilever and the sample approach each other at a predetermined speed, and to stop the approach operation when it is determined that a contact between the probe and the sample has been made, wherein the predetermined speed is set such that, when a control operation to stop the approach operation is performed, force applied to the sample by the contact between the probe and the sample does not exceed a first force which is preset.

(2) According to an aspect of the present disclosure, there is provided a scanning probe microscope for scanning a surface of a sample with a probe of a cantilever, the scanning probe microscope including: a movement driving unit capable of moving the cantilever and the sample relatively at least in z direction; and a control device controlling the movement driving unit to separate the cantilever and the sample by a predetermined distance relative to each other, thereby separating the probe and the sample, wherein the control device directly or indirectly measures an adsorptive force between the probe and at least one point on the surface, and sets the predetermined distance based on one or more of the measured adsorptive force.

(3) According to an aspect of the present disclosure, there is provided a method of setting a predetermined speed and a predetermined distance by a scanning probe microscope that is capable of performing an approach operation of making a cantilever and a sample approach to each other at the predetermined speed until a probe with which the cantilever is provided and the sample come into contact with each other, and performing a separation operation of separating the cantilever and the sample relatively by the predetermined distance after the approach operation, the method including at least one of the following steps: a first setting step where the predetermined speed is set such that when the approach operation is stopped, force applied to the sample due to contact between the probe and the sample does not exceed a preset first force; and a second setting step where an adsorptive force between the probe and at least one point on a surface of the sample is directly or indirectly measured and the predetermined distance is set on the basis of the measured at least one adsorptive force.

BRIEF DESCRIPTION OF THE DRAWINGS

The above and other objectives, features, and advantages of the present disclosure will be more clearly understood from the following detailed description taken in conjunction with the accompanying drawings, in which.

DESCRIPTION OF THE PREFERRED EMBODIMENTS

Hereinafter, a scanning probe microscope according to an embodiment will be described with reference to the drawings.

The scanning probe microscope A of an embodiment makes a probe come into contact with a sample surface and scan a sample surface, thereby measuring a shape of the sample surface. For example, applying an intermittent measurement method, the scanning probe microscope A uses the probe to scan the sample surface. The intermittent measurement method is a method in which the probe is made to come into contact with the sample surface and the probe scans the sample surface intermittently. For example, the intermittent measurement method may be called Sampling Intelligent Scan. However, the scanning probe microscope A is not limited to the intermittent measurement method. While maintaining any interaction between the probe and the sample, the scanning probe microscope A makes the probe scan the sample surface continuously, thereby measuring the shape of the surface of the sample.

For example, while always keeping the probe and the sample in contact with each other, the scanning probe microscope A scans the surface of the sample, thereby measuring the shape of the sample surface. For example, while making the probe come into contact with the sample periodically, the scanning probe microscope A scans the surface of the sample, thereby measuring the shape of the sample surface.

Figure 1:
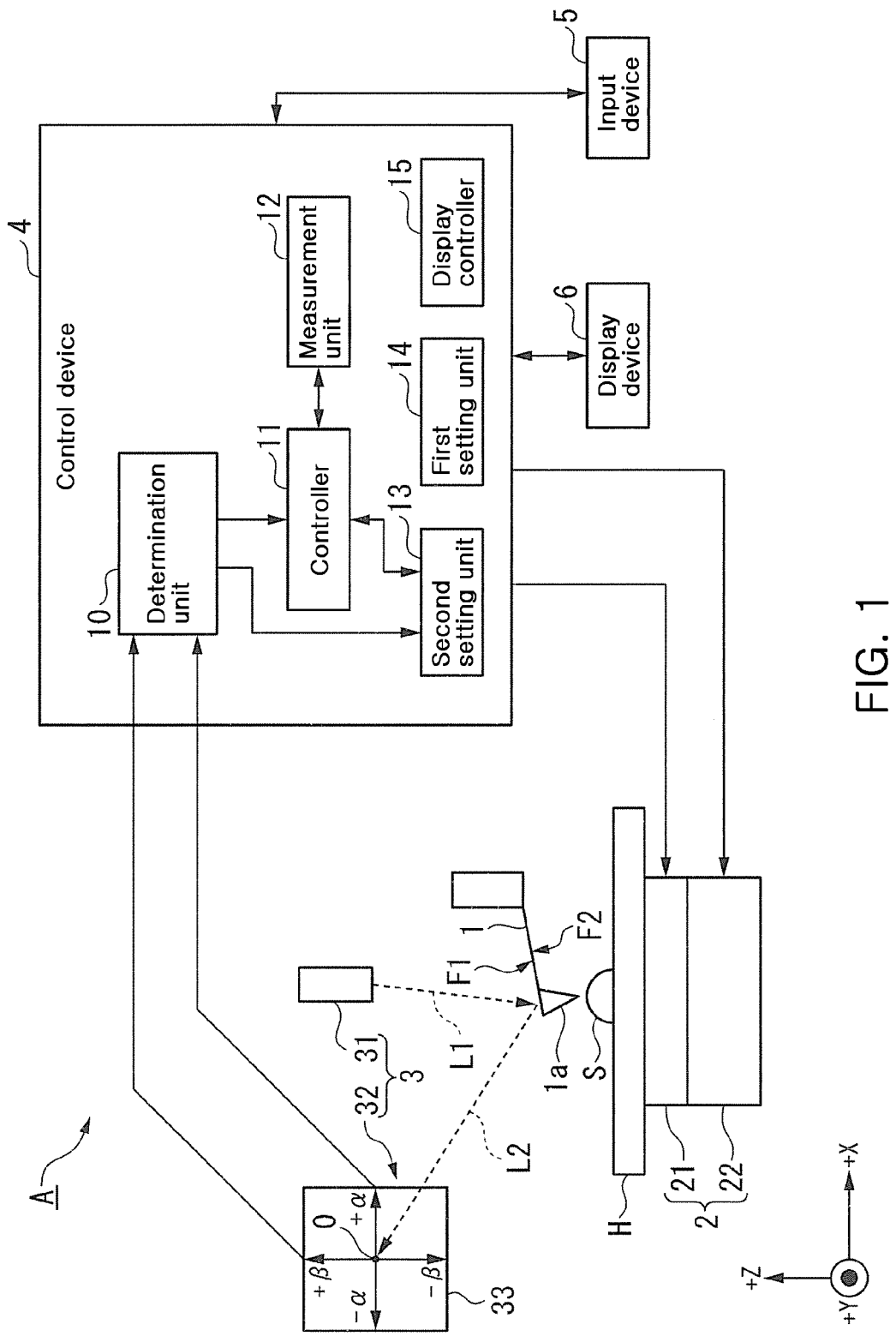
FIG. 1 is a diagram showing an example of a schematic configuration of a scanning probe microscope A according to an embodiment.

FIG. 1 is a diagram showing an example of a schematic configuration of a scanning probe microscope A according to an embodiment. As shown in FIG. 1, the scanning probe microscope A includes a cantilever 1, a movement driving unit 2, a deflection detection unit 3, a control device 4, an input device 5, and a display device 6.

A front end of the cantilever 1 is provided with a probe 1a. The cantilever 1 has its base end fixed and its front end as a free end. The cantilever 1 is an elastic lever member having a small spring constant K. When the probe 1a at the front end comes into contact with the surface of a sample S (hereinafter, referred to as a "sample surface"), the cantilever 1 is bent due to the pressing force of the probe 1a at the front end pressing the sample surface.

In the case where a sample surface has a slope, when the probe 1a at the front end comes into contact with the sample surface, the cantilever 1 is twisted or bent due to the slope of the sample surface and a reaction force at a supporting point that is a point of contact between the probe 1a at the front end and the sample surface.

The movement driving unit 2 is a fine movement unit capable of moving the probe 1a and the sample S relatively in three-dimensional directions. The movement driving unit 2 includes a Z-direction driving device 21 and an XY scanner 22 (scanner unit).

On the Z-direction driving device 21, a sample plate H is placed. On the sample plate H, the sample S is placed facing the probe 1a of the cantilever 1. The Z-direction driving device 21 moves the sample plate H in a direction (z direction) vertical to the horizontal plane. For example, the Z-direction driving device 21 is a scanner having a piezoelectric element. Controlled by the control device 4, the Z-direction driving device 21 moves the sample plate H in the z direction so as to move the sample surface towards the probe 1a, or to move the sample S in a direction of being separated from the probe 1a.

Controlled by the control device 4, the XY scanner 22 moves the probe 1a and the sample S relatively in x and y directions. In addition, in FIG. 1, a plane parallel to the surface of the sample plate H is the horizontal plane. Herein, the plane is defined as an XY plane by two axes X, and Y) perpendicular to each other. For example, the XY scanner 22 is a piezoelectric element. An arrangement relationship between the Z-direction driving device 21 and the XY scanner 22 is not important as long as the Z-direction driving device 21 and the XY scanner 22 are elements capable of performing relative scanning for shape observation in three dimensions. That is, whether cantilever scanning or sample scanning is performed does not matter.

The deflection detection unit 3 detects an amount of bending or an amount of torsion of the cantilever 1. For example, the deflection detection unit 3 detects the amount of bending and the amount of torsion of the cantilever 1 by using an optical lever type.

The deflection detection unit 3 includes a light emission unit 31 and a light detection unit 32.

The light emission unit 31 irradiates a reflective surface (not shown) formed on a back surface (first surface) F1 of the cantilever 1 with laser light L1. Herein, the back surface (first surface) F1 is, regarding the cantilever 1, a surface opposite to a surface (second surface) F2 on which the probe 1a is placed.

The light detection unit 32 receives laser light L2 reflecting off the reflective surface. The light detection unit 32 includes a light-receiving surface 33 divided into four parts that receives the laser light L2 reflecting off the reflective surface. The laser light L2 reflecting off the reflective surface of the cantilever 1 enters the four parts acquired by dividing the light-receiving surface 33 of the light detection unit 32. In addition, for example, the position of the light detection unit 32 is adjusted so that the laser light L2 reflecting off the reflective surface of the cantilever 1 enters near the center of the light-receiving surface 33.

Figure 2:
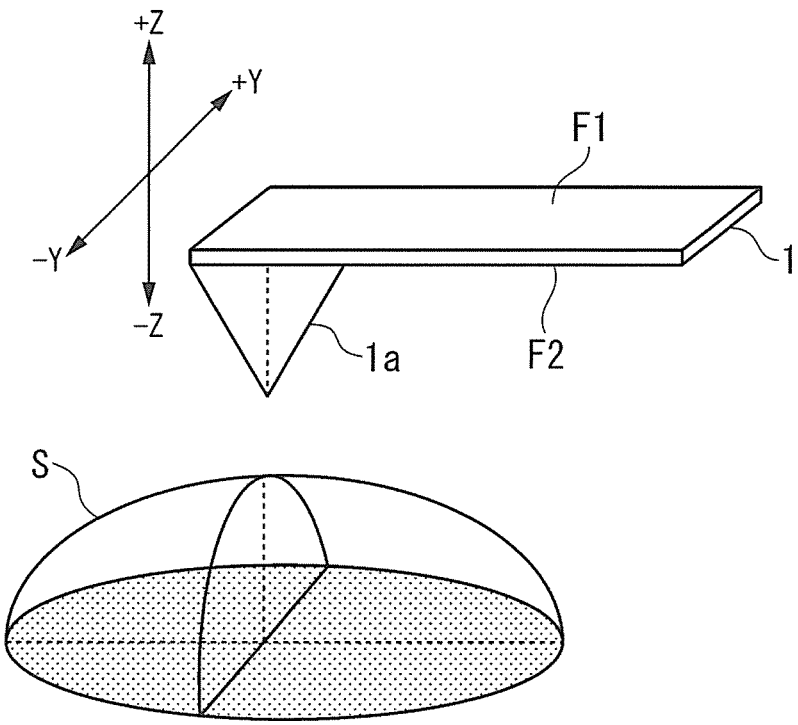
FIG. 2 is a perspective view of a sample S having a slope and a cantilever 1 according to an embodiment.

Hereinafter, a method of detecting the amount of bending and the amount of torsion of the cantilever 1 according to an embodiment will be described with reference to FIGS. 1 and 2. FIG. 2 is a perspective view of a sample S having a slope and the cantilever 1.

When the contact between the probe 1a and the sample surface has been made, the cantilever 1 is deflected in the z direction or the y direction, or both. In an embodiment, the deflection of the cantilever 1 in the z direction is referred to as the amount of bending and the deflection of the cantilever 1 in the y direction is referred to as the amount of torsion. For example, in an initial condition, a position of an incident spot of the reflected laser light L2 on the light-receiving surface 33 of the light detection unit 32 in a state where no force is applied to the probe 1a is set as the center position O of the light-receiving surface 33. In addition, the state where no force is applied to the probe 1a refers to, for example, a state where there is no deformation of the cantilever caused by force during contact because the probe 1a and the sample surface are not in contact with each other.

In a contact mode, when the contact between the probe 1a and the sample surface has been made, force is applied to the probe 1a, so that the cantilever 1 is bent or twisted. Therefore, on the reflective surface of the bend or twisted cantilever 1, a position of a reflection spot of the reflected laser light L2 is displaced from the center position O. Thus, the scanning probe microscope A identifies the movement direction of the position of the spot on the light-receiving surface 33 of the light detection unit 32, thereby detecting the size and the direction of the force applied to the probe 1a.

For example, in FIG. 1, when the cantilever 1 is twisted, a change in the position of the spot in direction α on the light-receiving surface 33 of the light detection unit 32 is identified. In addition, when the cantilever 1 is bent, a change in the position of the spot in direction β on the light-receiving surface 33 is identified.

Herein, a variation in the position of the spot from the center position O depends on the amount of torsion or the amount of bending. Specifically, when the cantilever 1 is bent in the +z direction, the reflection spot of the laser light L2 on the light-receiving surface 33 of the light detection unit 32 is changed in direction +β. In addition, when the cantilever 1 is bent in the −z direction, the reflection spot of the laser light L2 on the light-receiving surface 33 of the light detection unit 32 is changed in direction −β. In the meantime, when the cantilever 1 is twisted in the +y direction, the position of the reflection spot of the laser light L2 on the light-receiving surface 33 of the light detection unit 32 is changed in direction +α. In addition, when the cantilever 1 is twisted in the −y direction, the reflection spot of the laser light L2 on the light-receiving surface 33 of the light detection unit 32 is changed in direction −α.

The light detection unit 32 outputs, to the control device 4, a first detection signal according to the position of the reflection spot of the laser light L2 in the ±z direction on the light-receiving surface 33. That is, the first detection signal is a DIF signal (bending signal) according to the amount of bending of the cantilever 1. In addition, the light detection unit 32 outputs, to the control device 4, a second detection signal according to the position of the reflection spot of the laser light L2 in the ±y direction on the light-receiving surface 33. That is, the second detection signal is an FFM (torsion signal) according to the amount of torsion of the cantilever 1.

Next, the control device 4 according to an embodiment will be described. As shown in FIG. 1, the control device 4 includes a determination unit 10, a controller 11, a measurement unit 12, a first setting unit 14, a second setting unit 13, and a display controller 15.

The determination unit 10 determines whether the contact between the probe 1a and the sample surface has been made, on the basis of at least one among the first detection signal and the second detection signal output from the light detection unit 32. In addition, in the following description, the processing of determining whether the contact between the probe 1a and the sample surface has been made is referred to as "contact determination processing". For example, when the amount of bending indicated by the first detection signal output from the light detection unit 32 exceeds a first range, the determination unit 10 determines that the contact between the probe 1a and the surface of the sample S has been made. For example, when the amount of torsion indicated by the second detection signal output from the light detection unit 32 exceeds a second range, the determination unit 10 determines that the contact between the probe 1a and the surface of the sample S has been made.

The determination unit 10 determines whether the probe 1a is separated from the sample surface, on the basis of the first detection signal and the second detection signal output from the light detection unit 32. In addition, in the following description, the processing of determining whether the probe 1a is separated from the sample surface is referred to as "separation determination processing".

The controller 11 controls the amount of the relative movement of the probe 1a and the sample S by controlling the movement driving unit 2. As an example, the scanning probe microscope A makes the probe 1a come into contact with only multiple preset measurement points on the sample surface, thereby scanning the sample surface intermittently. The controller 11 performs an approach operation of making the cantilever 1 and the sample S approach to each other at an approach speed V that is a predetermined speed. During the approach operation, the contact determination processing is performed, and the controller 11 stops the approach operation when it is determined that the contact between the probe 1a and the sample surface has been made. After stopping the approach operation, the controller 11 separates the cantilever 1 and the sample S relatively by a withdrawal distance L that is a predetermined distance, thereby performing a separation operation of separating the probe 1a and the sample S. The controller 11 performs the approach operation and the separation operation with respect to each of the multiple preset measurement points, thereby scanning the sample surface intermittently. The approach speed V and the withdrawal distance L are preset.

An example of the approach operation and the separation operation of an embodiment will be described. The controller 11 outputs, to the Z-direction driving device 21, a contact operation signal for making the probe 1a and the sample surface come into contact with each other. When the Z-direction driving device 21 receives the contact operation signal, the Z-direction driving device 21 raises the sample S at the preset approach speed V. Consequently, the cantilever 1 and the sample surface approach to each other. During the approach operation, the determination unit 10 performs the contact determination processing. When it is determined through the contact determination processing that the contact between the probe 1a and the sample surface has been made, the controller 11 stops the outputting of the contact operation signal to the Z-direction driving device 21. Consequently, the Z-direction driving device 21 stops the approach operation of raising the sample S. The approach operation is any operation of making the cantilever 1 and the sample S approach to each other at the approach speed V, or may be an operation of lowering the cantilever 1 at the preset approach speed V. The approach operation may be an operation of lowering the cantilever 1 and raising the sample S.

When it is determined through the contact determination processing that the contact between the probe 1a and the sample surface has been made, the controller 11 outputs a separation operation signal to the Z-direction driving device 21 so as to separate the sample surface from the probe 1a. When the Z-direction driving device 21 receives the separation operation signal, the Z-direction driving device 21 lowers the sample S. Consequently, the controller 11 moves the sample S by the withdrawal distance L in the direction of being separated from the probe 1a and withdraws the sample S from a state where the sample surface is in contact with the probe 1a.

The controller 11 outputs a driving signal to the XY scanner 22 to move the probe 1a to a measurement descent position immediately above a next measurement position.

The measurement unit 12 measures the shape of the sample surface while the probe 1a and the sample surface are in contact with each other. For example, when it is determined through the contact determination processing that the contact between the probe 1a is and the sample surface has been made, the measurement unit 12 measures the distance that the sample S has relatively moved to the probe 1a in the approach operation. Consequently, the measurement unit 12 measures the shape of the surface of the sample S. For example, the measurement unit 12 may calculate the relative distance on the basis of a voltage value of the contact operation signal in the state where the probe 1a and the sample surface are in contact with each other. In addition, the measurement unit 12 may directly measure the displacement of the sample plate H by using a sensor, or may directly measure the height of the sample plate H by using a sensor.

The first setting unit 13 sets the approach speed V before the shape of the surface of the sample S is measured. The first setting unit 13 performs setting such that the force applied to the sample S due to contact between the probe 1a and the sample S does not exceed a preset first force Fmax when the approach operation is stopped. The first force Fmax is the maximum value of the force allowed to be applied to the sample S. Information on the first force Fmax is previously stored in the control device 4. The first force Fmax may be determined, for example, on the basis of a material of the sample S, damage allowed to the sample S, and the like. For example, the information on the first force Fmax is output to the control device 4 by the input device 5.

The second setting unit 14 sets the withdrawal distance L before the shape of the surface of the sample S is measured. The second setting unit 14 directly or indirectly measures an adsorptive force Fad between the probe 1a and at least one point on the surface of the sample S. The second setting unit 14 sets the withdrawal distance L on the basis of the measured one or more adsorptive forces (Fad).

The display controller 15 makes the display device 6 display a setting screen 100 having a user interface for setting the first force Fmax and the second force Fref.

The input device 5 is connected to the control device 4. The input device 5 receives an input from a user and outputs information on the input (hereinafter, referred to as "input information) to the control device 4. For example, the input device 5 is a touch panel; a hardware key typified by a keyboard, etc.; or a pointing device such as a mouse, etc. The input device may receive an operation input that is in a voice, like a microphone, etc.

The display device 6 is connected to the control device 4. The display device 6 display information output from the control device 4 on a display screen.

Hereinafter, a method of setting the approach speed V by the first setting unit 13 will be described.

The first setting unit 13 performs setting on the basis of a speed Vx shown in Equation (1) below. The first setting unit 13 may set the speed Vx shown in the following equation as the approach speed V. The first setting unit 13 may set any value equal to or less than the speed Vx shown in the following equation as the approach speed V.

$$Vx = C \times ((Fmax - Fref)/K)/T \quad (1)$$

The letter C denotes a predetermined constant. The letter K denotes the spring constant of the cantilever 1. The letter T denotes a time lag between when it is determined through the contact determination processing that the contact between the probe 1a and the sample surface has been made and when the approach operation is stopped. The second force Fref is the force applied to the cantilever 1 when it is determined through contact determination processing that the contact between the probe 1a and the sample surface has been made. In other words, the second force Fref is the pressing force when it is determined through the contact determination processing that the contact between the probe 1a and the sample surface has been made. Therefore, in the contact determination processing, the determination unit 10 detects the amount of bending or the amount of torsion when the second force Fref is applied to the cantilever 1 so as to determine that the contact between the probe 1a and the sample surface has been made.

For example, the movement driving unit 2 has the scanner using the piezoelectric element. There is an inevitable response delay in the piezoelectric element. That is, in the case where the approach operation is performed using the piezoelectric element, there is a time lag between when a signal for commanding to stop the approach operation (including the case of direct transition from the approach operation to the separation operation) is acquired from the control device 4 and when the approach operation is actually stopped. Because the approach operation continues even during the time lag, the pressing force of the probe 1a to the sample S may be equal to or greater than the second force Fref, ultimately. Therefore, it is necessary to set the approach speed V by adding the response delay. However, up to now, the approach speed V has been set by determination based on the user's experience, etc. Therefore, there has been a case where the approach speed V has not been set to an optimum value. As a result, up to now, it has not been fulfilled that the time taken to measure the shape of the sample surface is reduced while excessive force is prevented from being applied to the sample S. The control device 4 of an embodiment adds the time lag T including the response delay that is generated by the movement driving unit 2, etc. and sets the approach speed on the basis of Equation (1) so that the pressing force does not exceed the preset first force Fmax.

Consequently, the control device 4 sets the approach speed V to the optimum value, and contributes to a reduction in the time taken for measuring. The time lag T is not limited only for the response delay generated by the movement driving unit 2. For example, the time lag T may include any delay, such as a delay caused by electronic circuits, a delay caused by a detection system, a delay caused by a control system, etc. Therefore, the idea disclosed in the embodiment may be applied to a case where a piezoelectric element is not used.

For example, as described above, when the response delay caused by the piezoelectric element is the main factor in the time lag T, the approach speed V gradually decreases and approaches 0 during the time lag T (this idea is referred to as a "creep phenomenon"). In an example, the approach speed V during the time lag T decreases exponentially. As described above, when the approach speed V gradually decreases, the predetermined constant C is set greater than that of a case where "the approach speed V during the time lag T is constant", which will be described later. For example, the predetermined constant C is greater than 0 and equal to or less than 2. Preferably, the predetermined constant C is greater than 1 and equal to or less than 2. In the meantime, when the response delay caused by the piezoelectric element is sufficiently smaller than a response delay caused by an electronic circuit, etc., it is considered that the probe 1a continues to approach at a constant speed and the probe 1a stops at the moment of receiving the stop command which has arrived late. Therefore, in this case, it may be considered that the approach speed V during the time lag T is constant. Therefore, in this case, the predetermined constant C may be set to be exactly 1, to be greater than 0 and equal to or less than 1, or to be equal to or greater than 0.9 and equal to or less than 1.

Hereinafter, a method of setting the withdrawal distance L by the second setting unit 14 will be described.

The second setting unit 14 directly or indirectly measures the adsorptive force Fad of the sample S before the shape of the surface of the sample S is measured. The second setting unit 14 calculates the amount of bending of the cantilever 1 where the force greater than the measured adsorptive force Fad is generated. The second setting unit 14 sets the acquired amount of bending as the withdrawal distance L. The adsorptive force may vary depending on each position on the surface of the sample S. Therefore, the second setting unit 14 may measure the adsorptive forces (Fad) at multiple points on the surface of the sample S. Then, the second setting unit 14 extracts the maximum adsorptive force Fadmax that is the maximum value among the adsorptive forces (Fad) measured at the multiple points. The second setting unit 14 may calculate the amount of bending of the cantilever 1 that becomes a value greater than the extracted maximum adsorptive force Fadmax, and may set the amount of bending as the withdrawal distance L.

The second setting unit 14 may perform statistical processing on the adsorptive forces (Fad) measured at the multiple points. For example, the second setting unit 14 may acquire the deviation of the adsorptive forces (Fad) measured at the multiple points, and may acquire the maximum adsorptive force Fadmax considering the deviation. For example, the maximum adsorptive force Fadmax is a value acquired by adding $3\sigma$ or $5\sigma$ to the average value of the adsorptive forces (Fad) measured at the multiple points. The standard deviation is denoted by $\sigma$. The second setting unit 14 may acquire the withdrawal distance L from Equation (2) below.

$$L = F_{admax}/K \qquad (2)$$

As an example, in setting the withdrawal distance L, the second setting unit 14 outputs a signal for the controller 11, and makes the separation operation take place in which the probe 1a and the sample S are separated after the probe 1a and the sample S come into contact with each other. During the separation operation, the determination unit 10 performs the separation determination processing. During the separation operation, when it is determined through the separation determination processing that the probe 1a is separated from the sample surface, the second setting unit 14 measures the adsorptive force Fad based on a distance Lx (hereinafter, referred to as a separation distance Lx) at which separation of the cantilever 1 is commanded when it is determined that the probe 1a is separated or immediately before the determination. The second setting unit 14 may acquire the force by multiplying the spring constant K and the separation distance Lx. The separation distance Lx may be the amount of bending of the cantilever 1. The second setting unit 14 may set a value equal to or greater than the separation distance Lx as the withdrawal distance L. For example, the second setting unit 14 may set a value acquired by adding or multiplying the predetermined constant C and the separation distance Lx, as the withdrawal distance L. The second setting unit 14 may measure the separation distance Lx at each of multiple points on the surface of the sample S. The second setting unit 14 extracts the maximum separation distance Lxmax that is the maximum value among the separation distances (Lx) measured at the multiple points. The second setting unit 14 may set a value greater than the extracted maximum separation distance Lxmax as the withdrawal distance L.

The second setting unit 14 may perform statistical processing on the separation distances (Lx) measured at the multiple points. For example, the second setting unit 14 may acquire the deviation of the separation distances (Lx) measured at the multiple points, and may acquire the maximum separation distance Lxmax considering the deviation. For example, the maximum separation distance Lxmax is a value acquired by adding $3\sigma$ or $5\sigma$ to the average value of the separation distances (Lx) measured at the multiple points.

The withdrawal distance L is the force calculated by multiplying the spring constant of the cantilever and the separation distance Lx so as to separate the probe 1a from the sample S. The withdrawal distance L needs to be set greater than the adsorptive force between the probe 1a and the sample S. However, the adsorptive force between the probe 1a and the sample S vary depending on each position on the sample surface. Because of this, in order to ensure separation even at the position having the maximum adsorptive force, the separation distance L has been set to a value with a margin on the basis of user experience. Therefore, when a large adsorptive force beyond the expectation is generated, the separation distance L is insufficient and the probe 1a and the sample S do not separate. The control device 4 of an embodiment actually measures the adsorptive force, and sets the separation distance Lx at which the force exceeding the maximum value of the adsorptive force is generated, as the withdrawal distance L. Consequently, the control device 4 sets the withdrawal distance L to the optimum value, and contributes to a reduction in the time taken for measuring.

Figure 3:
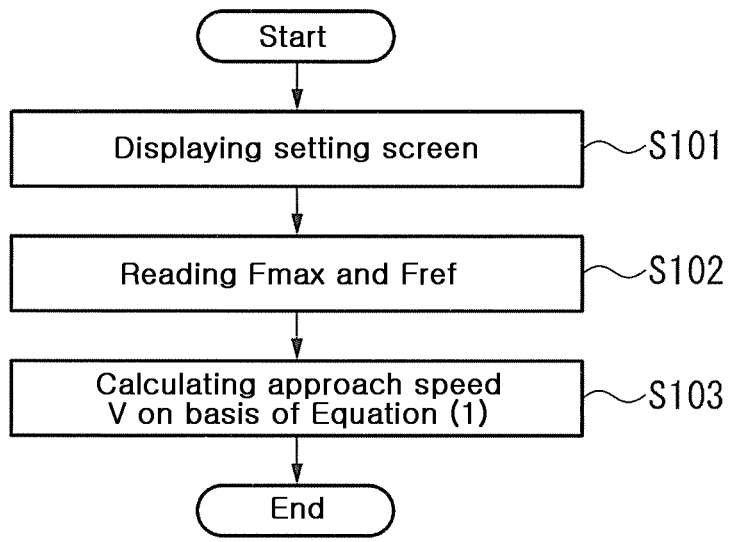
FIG. 3 is a flowchart showing a method of setting an approach speed V according to an embodiment.

Hereinafter, the flow of the method of setting the approach speed V by the first setting unit 13 will be described with reference to FIG. 3.

Figure 4:
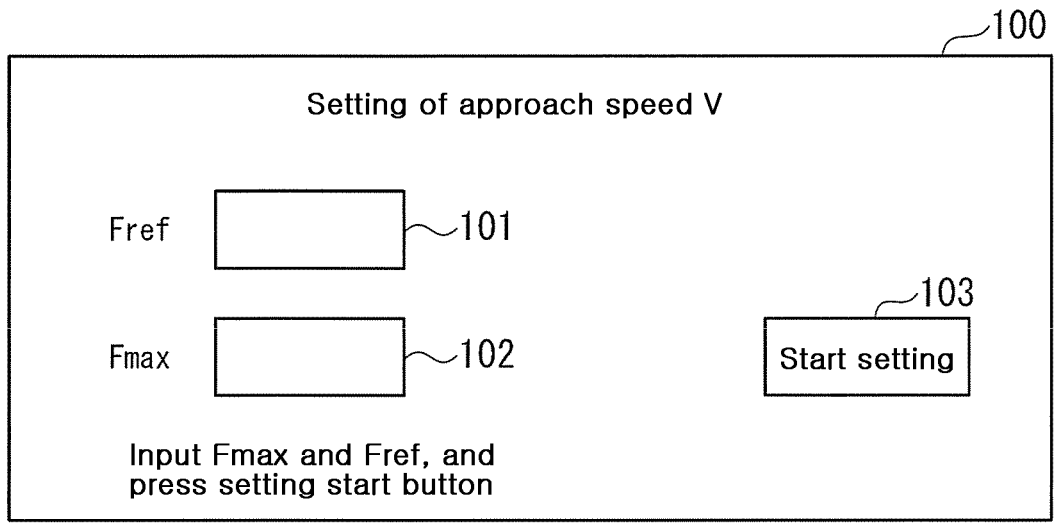
FIG. 4 is a diagram showing an example of a user interface for setting a first force Fmax and a second force Fref according to an embodiment.

The display controller 15 makes the display device 6 display the setting screen 100 that is the user interface for setting the first force Fmax and the second force Fref, at step S101. FIG. 4 shows an example of the setting screen 100. The setting screen 100 includes an input window 101 for the user to input the first force Fmax by operating the input device 5. The setting screen 100 includes an input window 102 for the user to input the second force Fref by operating the input device 5. The setting screen 100 includes a setting start button 103. The user inputs the first force Fmax to the input window 101 and inputs the second force Fref to the input window 102. Then the user presses the setting start button 103 on the setting screen 100 by using the input device 5, thereby starting setting of the approach speed V.

When the setting start button 103 is pressed, the first setting unit 13 reads the first force Fmax input to the input window 101 and the second force Fref input to the input window 102, at step S102. The first setting unit 13 applies the read first force Fmax and the read second force Fref to Equation (1) and calculates the speed Vx at step S103. As an example, the first setting unit 13 sets the speed Vx as the approach speed V. Consequently, the first setting unit 13 sets the approach speed V at which the force acquired by subtracting the second force Fref from the first force Fmax is not generated for the sample S during the time lag T.

Figure 5:
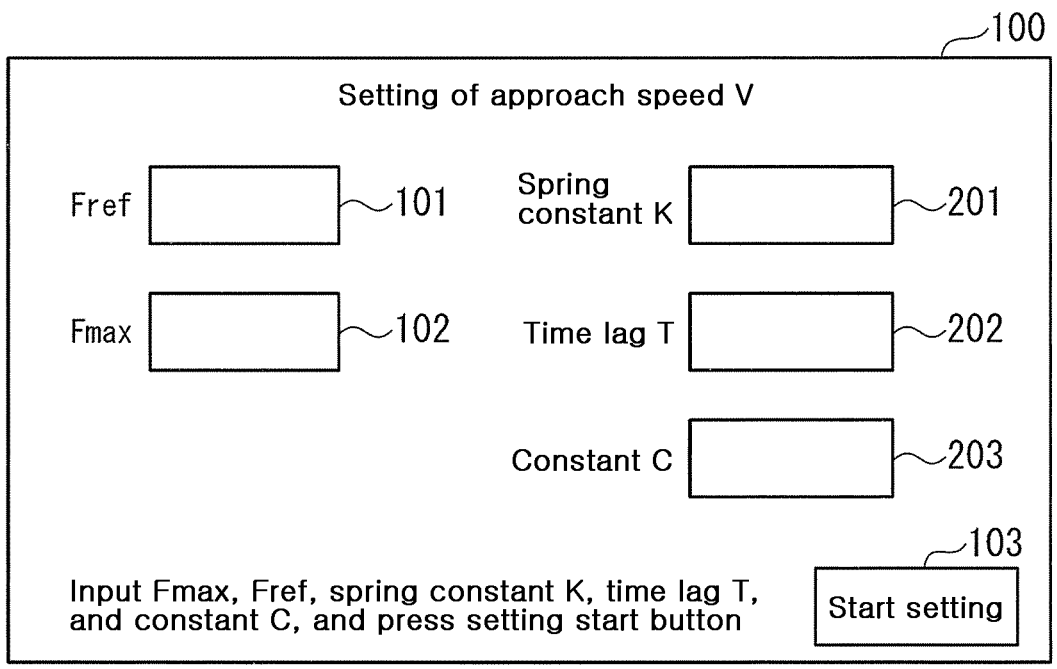
FIG. 5 is a diagram showing an example of a user interface for setting a first force Fmax and a second force Fref according to an embodiment.

The setting screen 100 may have a selection screen for selecting a type of cantilever 1 and a type of Z-direction driving device 21. The first setting unit 13 may set the spring constant K depending on the type of cantilever 1 selected by the user from the selection screen. The first setting unit 13 may set the time lag T depending on the type of Z-direction driving device 21 selected by the user from the selection screen. The setting screen 100 may have an input window 201 for inputting the spring constant K as shown in FIG. 5. The setting screen 100 may have an input window 202 for inputting the time lag T as shown in FIG. 5. The setting screen 100 may have an input window 203 for inputting the constant C as shown in FIG. 5. In this case, the first setting unit 13 further reads, at step S102, the spring constant K input to the input window 201 and the time lag T input to the input window 202. Then, the first setting unit 13 applies the read first force Fmax, the read second force Fref, the read spring constant K, and the read time lag T to Equation (1) and calculates the speed Vx.

Figure 6:
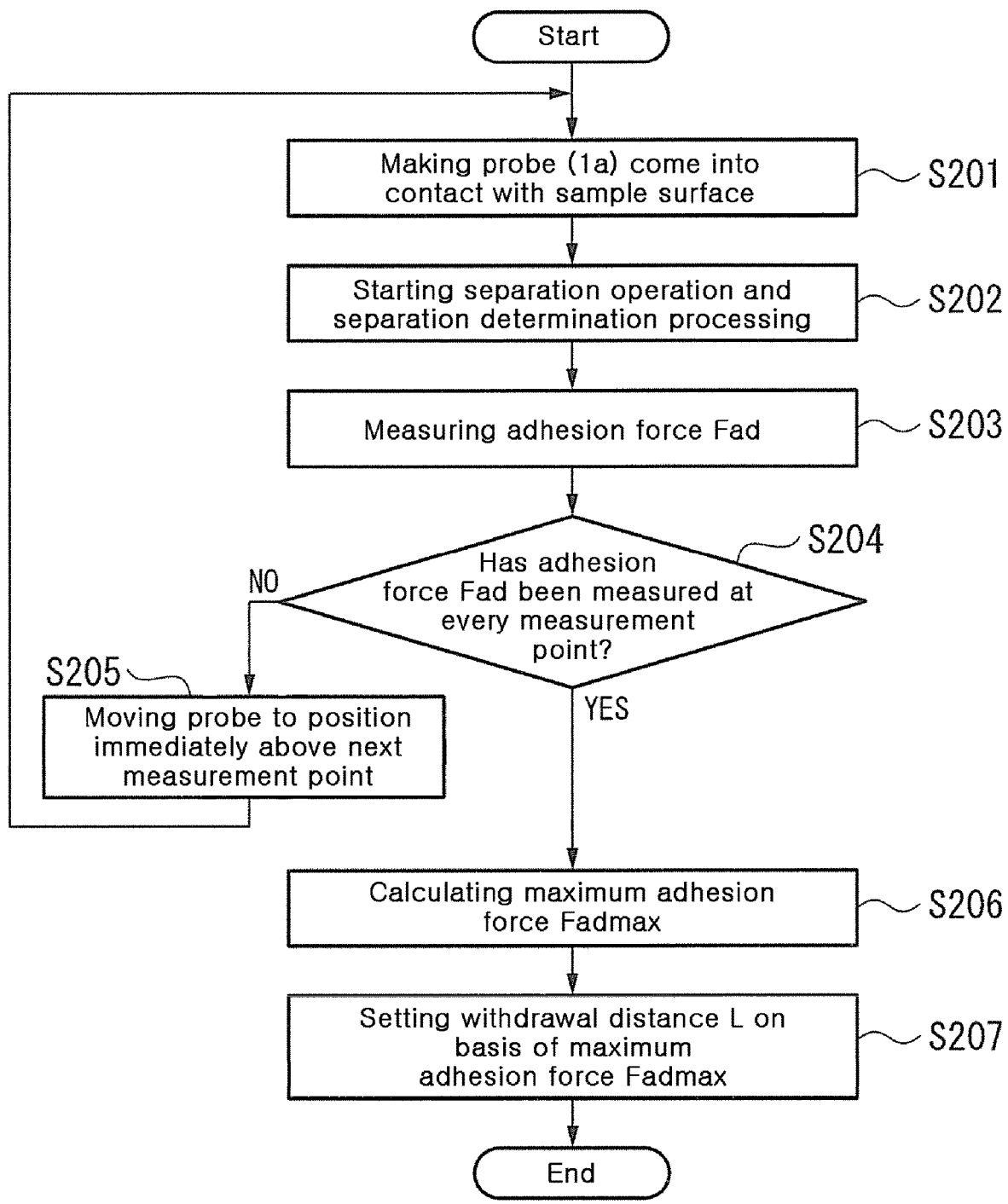
FIG. 6 is a flowchart showing a method of setting a withdrawal distance L according to an embodiment.

Hereinafter, the flow of the method of setting the withdrawal distance L by the second setting unit 14 will be described with reference to FIG. 6.

Before the shape of the surface of the sample S is measured, the second setting unit 14 measures the adsorptive force Fad at multiple measurement points preset on the sample surface. The controller 11 makes the probe 1a come into contact with one of the multiple measurement points at step S201, and performs the separation operation at step S202. During the separation operation, the determination unit 10 performs the separation determination processing. During the separation operation, the second setting unit 14 measures, as the adsorptive force Fad at step S203, the separation distance Lx between the cantilever 1 and the sample S when it is determined through the separation determination processing that the probe 1a is separated from the sample surface. The control device 4 determines whether measurement of the adsorptive force Fad at every measurement point has been completed, at step S204. When measurement of the adsorptive force Fad at every measurement point has not been completed, the control device 4 moves the probe 1a to the position immediately above the measurement point at which measurement of the adsorptive force Fad has not been completed, at step S205, and proceeding to steps S201 to S203 takes place.

When measurement of the adsorptive force Fad at every measurement point has been completed, the control device 4 calculates the maximum adsorptive force Fadmax on the basis of the adsorptive force (Fad) at every measurement point at step S206. Then, the control device 4 sets, as the withdrawal distance L at step S207, the amount of bending at which the force greater than the maximum adsorptive force Fadmax may be generated at the cantilever 1.

Although the embodiments of the present disclosure have been described with reference to the drawings, the detailed configuration is not limited to the embodiments, and other designs, etc. may be made without departing from the gist of the present disclosure.

The movement driving unit 2 may be a tubular piezoelectric element or a voice coil type motor. In addition, the Z-direction driving device 21 may be a laminated piezoelectric element.

The control device 4 performs the approach operation of making the cantilever 1 and the sample S approach to each other at the approach speed V. However, when the distance between the probe 1a and the sample S is greater than a predetermined value, the control device 4 makes the cantilever 1 and the sample S approach to each other at a speed faster than the approach speed V. When the distance between the probe 1a and the sample S is equal to or less than the predetermined value, the control device 4 performs the approach operation at the approach speed V set by the first setting unit 13.

The scanning probe microscope A of an embodiment may include at least any one among the first setting unit 13 and the second setting unit 14. The scanning probe microscope A may reduce the time taken for measuring, by performing at least any one of the following: setting of the approach speed V by the first setting unit 13; and setting of the withdrawal distance L by the second setting unit 14.

The method of setting the approach speed V of an embodiment may be applied to all scanning probe microscopes having an operation of making the probe 1a approach the sample S. Therefore, the method of setting the approach speed V of an embodiment is not applied only to a scanning probe microscope that uses the intermittent measurement method. The method of setting is also applied to all devices making the probe 1a approach the sample S to determine, on the basis of bending or torsion of the probe 1a, whether contact occurs.

The method of setting the withdrawal distance L of an embodiment may be applied to all scanning probe microscopes having an operation of making the probe 1a and the sample S separate. Therefore, the method of setting the withdrawal distance L of an embodiment is not applied only to a scanning probe microscope that uses the intermittent measurement method. The method of setting is also applied to all scanning probe microscopes having the separation operation.

For the separation determination processing by the determination unit 10, a known technique may be used. For example, the determination unit 10 may use separation determination processing disclosed in Japanese Patent Application No. 2017-63530. For example, during the separation operation, when the vibration of the cantilever 1 at a predetermined amplitude is detected using a resonance frequency of the cantilever, the determination unit 10 determines that the probe 1a is separated from the sample surface. In addition, based on the position of the cantilever 1 in a free state, the predetermined amplitude is a range smaller than the deflection of the cantilever 1 in a state where the probe 1a is in contact with the sample surface. For example, in the case where at a speed exceeding the response speed of the cantilever 1, the sample S is made to move in the direction of being separated from the probe 1a, the separation determination processing may be the processing of determining whether the rate of change in the amplitude in the bending direction near the resonance frequency of the cantilever 1 is equal to or greater than a predetermined value. Herein, the case where the rate of change in the amplitude in the bending direction is equal to or greater than the predetermined value refers to the case where the amplitude in the bending direction increases rapidly. In addition, in the case where at a speed exceeding the response speed of the cantilever 1, the sample S is made to move in the direction of being separated from the probe 1a, the separation determination processing may be the processing of determining whether the frequency of the vibration of the cantilever 1 at the predetermined amplitude is the resonance frequency of the cantilever.

In the case where at a speed exceeding the response speed of the cantilever 1, the sample S is made to move in the direction of being separated from the probe 1a, when it is determined that the frequency of the vibration of the cantilever 1 is the resonance frequency of the cantilever and that the rate of change in the amplitude of the cantilever 1 is equal to or greater than the predetermined value, the determination unit 10 determines that the probe 1a is separated from the sample surface. In the meantime, in the case where at a speed exceeding the response speed of the cantilever 1, the sample S is made to move in the direction of being separated from the probe 1a, when it is determined that the frequency of the vibration of the cantilever 1 is not the resonance frequency of the cantilever or that the rate of change in the amplitude of the cantilever 1 is less than the predetermined value, the determination unit 10 determines that the probe 1a is in contact with (is not separated from) the sample surface.

In the case where the separation operation is performed to measure the shape of the sample surface, the control device 4 performs the separation operation until the distance between the cantilever 1 and the sample S approaches the withdrawal distance L set by the second setting unit 14. During the separation operation following the measurement of the shape of the sample surface, the control device 4 may perform the separation determination processing. For example, in the case where the separation operation is performed until the distance between the cantilever 1 and the sample S approaches the withdrawal distance L set by the second setting unit 14, the control device 4 may perform the separation determination processing. In the separation determination processing, when it is determined that the probe 1*a* is not separated from the sample surface, the control device 4 performs the separation operation until it is determined that the probe 1*a* is separated from the sample surface. In addition, the control device 4 may update the withdrawal distance L set by the second setting unit 14 with the separation distance when it is determined that the probe 1*a* is separated from the sample surface.

The control device 4 includes a processor. For example, the processor is a CPU and an MPU. For example, the control device 4 may be a micro controller. The control device 4 may include at least any one among a non-volatile semiconductor and a volatile semiconductor. The control device 4 may be implemented by execution of a program by the processor. At least one or some of the elements of the control device 4 may be implemented in hardware or by cooperation between software and hardware. The program executed by the processor makes the control device 4 function as the determination unit 10, the controller 11, the measurement unit 12, the first setting unit 13, the second setting unit 14, and the display controller 15 described with reference to FIGS. 1 to 6.

For example, the hardware is any one among Large Scale Integration (LSI), an application specific integrated circuit (ASIC), a field-programmable gate array (FPGA), and a graphics processing unit (GPU). The program may be stored in a storage device in advance. The storage device is a non-transitory storage medium. For example, the storage device is any one among a hard disk drive (HDD) and a flash memory. The program may be stored in a removable storage medium. In this case, a storage medium is loaded into a drive device and the program is thus installed in the storage device. The storage medium is a non-transitory storage medium. For example, the storage medium is a DVD or a CD-ROM.

What is claimed is:

1. A scanning probe microscope for scanning a surface of a sample with a probe of a cantilever, the scanning probe microscope comprising:
    a movement driving unit capable of moving the cantilever and the sample relatively at least in z direction; and
    a control device controlling the movement driving unit to perform an approach operation of making the cantilever and the sample approach each other at a predetermined speed, and to stop the approach operation when it is determined that a contact between the probe and the sample has been made,
    wherein the predetermined speed is set such that, when a control operation to stop the approach operation is performed, a force applied to the sample due to the contact between the probe and the sample does not exceed a preset first force, and wherein the preset first force is inputted to the scanning probe microscope before the predetermined speed is set.
2. The scanning probe microscope of claim 1, wherein the predetermined speed is set based at least on a time lag between when the control operation to stop the approach operation is performed and when the approach operation is stopped.
3. The scanning probe microscope of claim 1 or 2, wherein the control device stops the approach operation when the contact between the probe and the sample is detected and
   wherein in case a predetermined constant is denoted by C, the preset first force is denoted by Fmax, a spring constant of the cantilever is denoted by K, a time lag between when the control device detects the contact between the probe and the sample and when the approach operation is stopped is denoted by T, and a second force, which is a force applied to the cantilever when the contact between the probe and the sample is detected, is denoted by Fref, the predetermined speed is set based on a speed (V) expressed by an equation, $V = C \times ((Fmax - Fref)/K)/T$.
4. The scanning probe microscope of claim 1, further comprising:
    a display controller making a display device display a user interface for setting the preset first force; and
    a setting unit setting the predetermined speed such that the force applied to the sample due to the contact between the probe and the sample does not exceed the preset first force set through the user interface.
5. A scanning probe microscope for scanning a surface of a sample with a probe of a cantilever, the scanning probe microscope comprising:
    a movement driving unit capable of moving the cantilever and the sample relatively at least in z direction; and
    a control device controlling the movement driving unit to separate the cantilever and the sample by a predetermined distance relative to each other, thereby separating the probe and the sample,
    wherein the control device directly or indirectly measures an adsorptive force between the probe and at least one point on the surface of the sample, and sets the predetermined distance based on one or more measured adsorptive force.
6. The scanning probe microscope of claim 5, wherein the control device comprises:
    a controller performing a separation operation of separating the probe and the sample after a contact between the probe and the sample is made;
    a determination unit determining during the separation operation whether the probe and the sample are separated from each other;
    a setting unit measuring, when it is determined by the determination unit that the probe and the sample are separated from each other, the adsorptive force based on a distance at which separation of the cantilever is commanded, and setting the predetermined distance on the basis of the measured adsorptive force.
7. A method of setting a predetermined speed and a predetermined distance for a scanning probe microscope that is capable of performing an approach operation of making a cantilever and a sample approach each other at the predetermined speed until a contact is made between the sample and a probe which is mounted on the cantilever, and of performing a separation operation of separating the cantilever and the sample by the predetermined distance relative to each other after the approach operation, the method comprising at least one of the following steps:
    a first setting step in which the predetermined speed is set such that, when the approach operation is stopped, a force applied to the sample by the contact between the probe and the sample does not exceed a first force which is preset; and
    a second setting step in which an adsorptive force between the probe and at least one point on a surface of the sample is directly or indirectly measured and the predetermined distance is set based on one or more of the measured adsorptive force.

* * * * *